April 7, 1959  H. C. ROBERTS  2,880,985
LOAD-MEASURING DEVICE
Filed Sept. 3, 1953  3 Sheets-Sheet 1
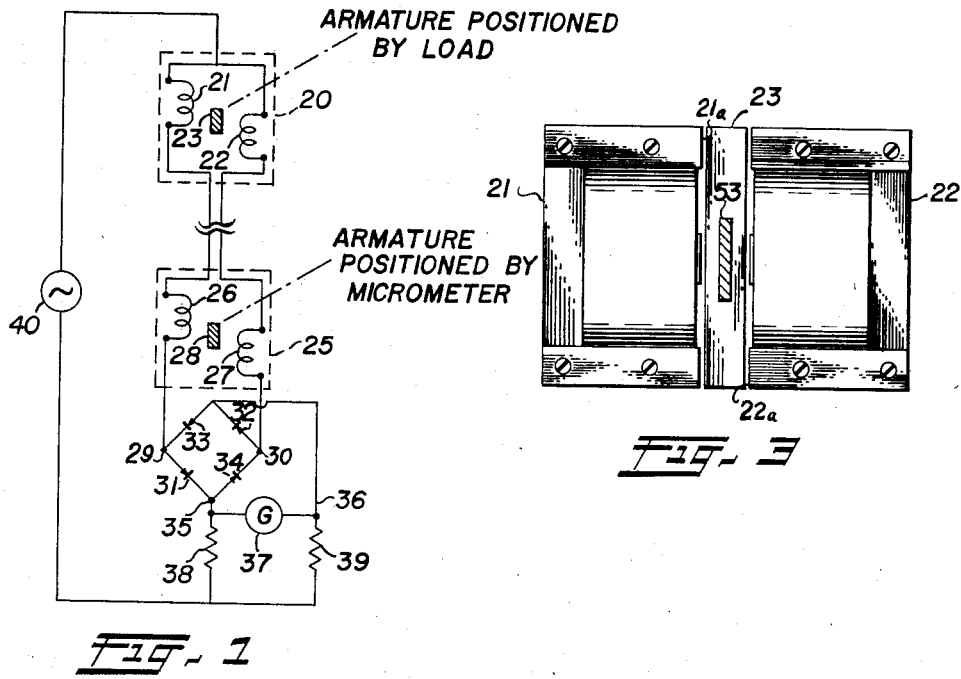
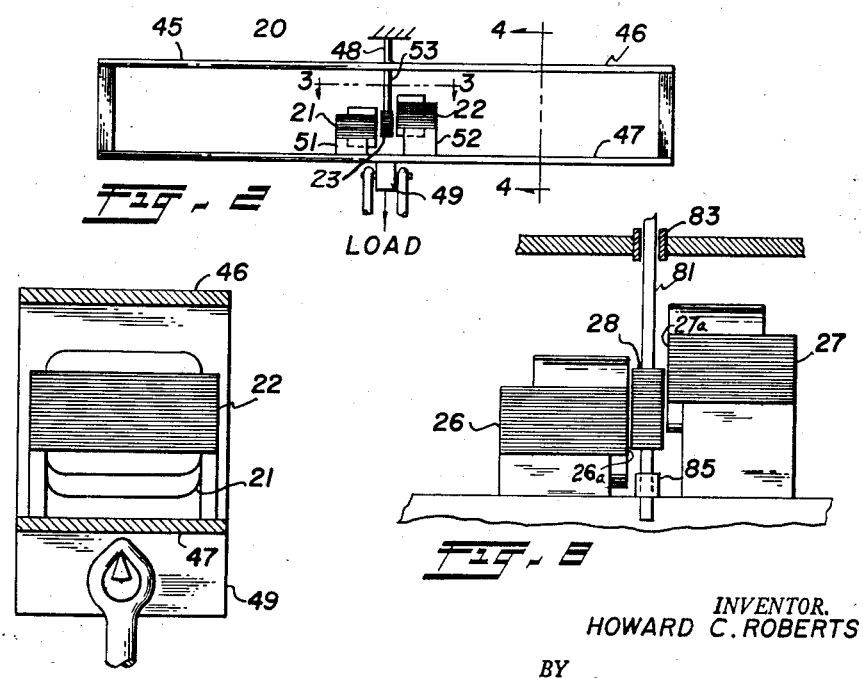
INVENTOR.
HOWARD C. ROBERTS
BY
Carlson, Pitzner, Hubbard & Wolfe
Attorneys April 7, 1959
H. C. ROBERTS
2,880,985
LOAD-MEASURING DEVICE
Filed Sept. 3, 1953
3 Sheets-Sheet 2
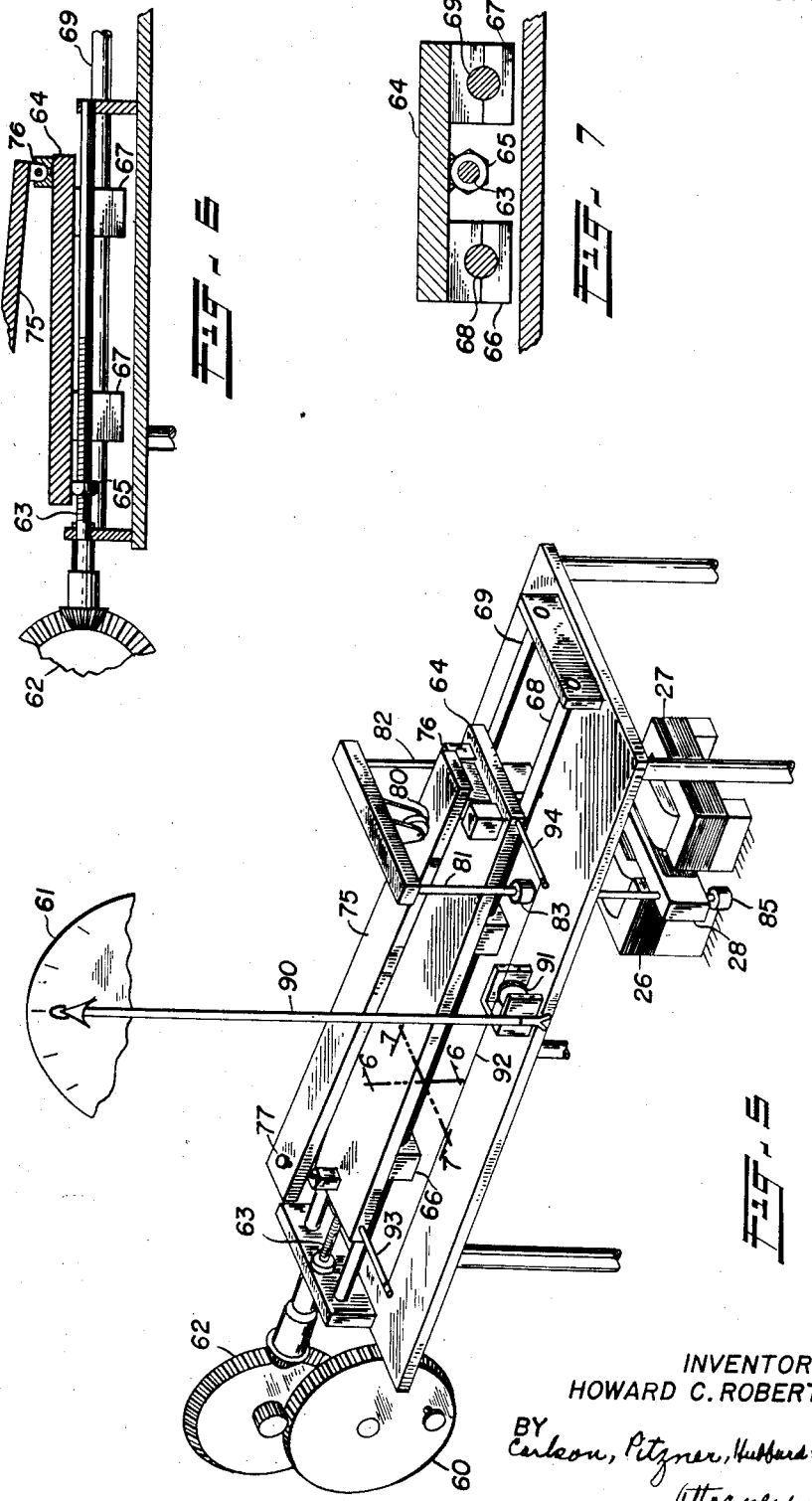
INVENTOR.
HOWARD C. ROBERTS April 7, 1959  H. C. ROBERTS  2,880,985
LOAD-MEASURING DEVICE
Filed Sept. 3, 1953  3 Sheets-Sheet 3
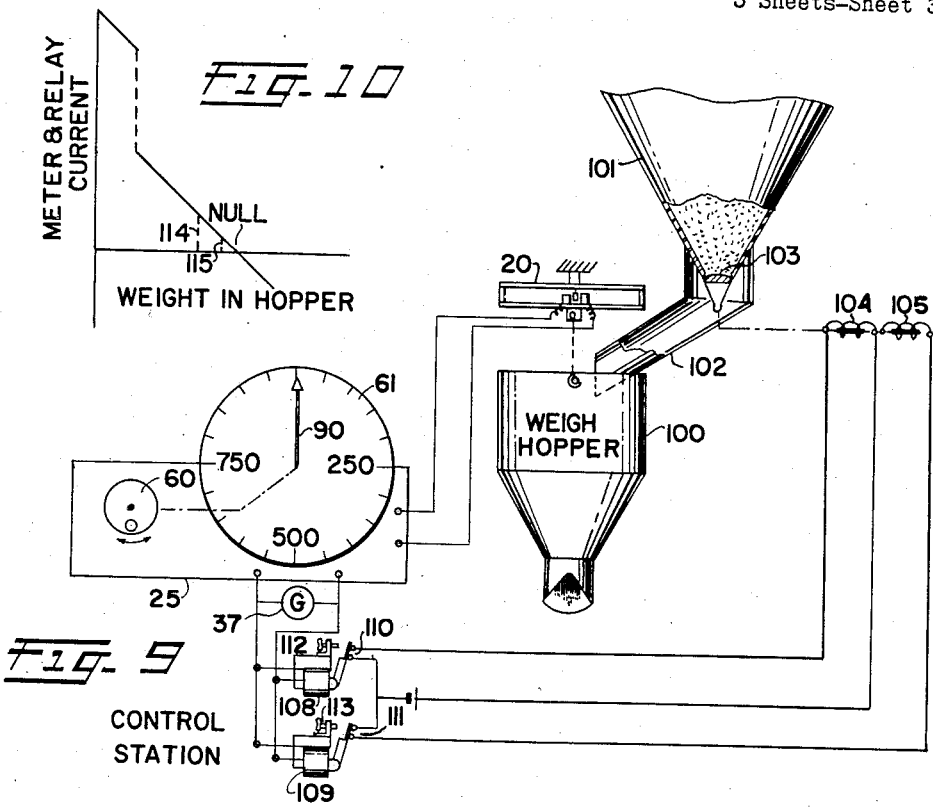
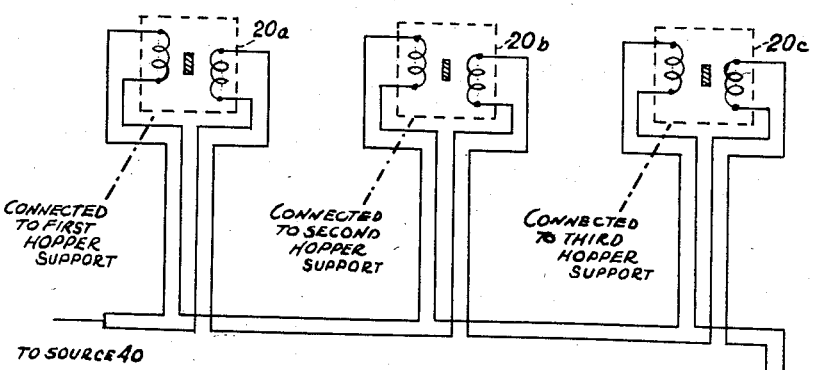
INVENTOR.
HOWARD C. ROBERTS
BY
Carlson, Pitzner, Hubbard + Wolfe
Attorneys.

United States Patent Office 2,880,985
Patented Apr. 7, 1959

2,880,985

LOAD-MEASURING DEVICE

Howard C. Roberts, Urbana, Ill., assignor, by mesne assignments, to Koehring Company, Milwaukee, Wis., a corporation of Wisconsin Application September 3, 1953, Serial No. 378,347

11 Claims. (Cl. 265—27)

The present invention relates to weighing devices, and more particularly to devices for weighing out predetermined amounts of bulk material.

It is an object of the invention to provide apparatus for weighing out bulk material which is more accurate than conventional devices and which permits weighing of successive batches with speed and precision. It is another object to provide a device for weighing bulk material which avoids mechanical connections between the weigh hopper and the weight indicators at the control station, and which is therefore eminently suited for remote operation of concrete batching equipment. It is still another object to provide a device of the above type which employs a novel electric circuit which is highly sensitive and which provides an output signal which is capable of controlling relays and similar control devices directly without use of complex amplifying devices.

It is an object related to the foregoing to provide a remote weighing arrangement which employs electrical connections between a weigh hopper and a control station, and which is capable of accurate weighing in spite of the use of long lines having appreciable electrical resistance. It is a further object to provide a remote weighing apparatus which is substantially independent of variations in ambient temperature at the hopper and at the control station and which retains its accuracy notwithstanding substantial differences in temperature between the two locations. More generally stated, it is an object to provide a system for remote weighing which is stable and which retains accurate calibration in spite of disturbances which would upset more conventional systems.

It is an object of the invention in one of its aspects to provide a control system for automatically weighing out any selected quantity of bulk material in accordance with the amount set by an operator on an indicator dial or the like.

Finally, it is an object to provide a weighing device which is inexpensive, which is easily set up and adjusted, and which requires a minimum of care and maintenance.

Other objects and advantages will become apparent upon reading the attached detailed description and upon reference to the drawings, in which—

Figure 1 is a schematic diagram of a four leg impedance-comparison circuit employed in practicing the present invention.

Fig. 2 is an elevation of a weight-responsive device used in Figure 1, for use in a weigh hopper or similar device.

Fig. 3 is a fragmentary plan view looking along the line 3—3 in Fig. 2.

Fig. 4 is a vertical section taken along the line 4—4 in Fig. 2.

Fig. 5 is a perspective showing the settable dial indicator and associated parts at the control station.

Fig. 6 is a vertical longitudinal section taken along the line 6—6 in Fig. 5.

Fig. 7 is a vertical transverse section taken along the line 7—7 of Fig. 5.

Fig. 8 is a fragmentary elevation showing the inductances employed in Fig. 5.

Fig. 9 is a schematic diagram showing an automatic system for weighing bulk materials.

Fig. 10 shows the variation of meter and relay current as a function of weight.

Fig. 11 is a schematic diagram showing use of the present invention for determining the total weight of material in a plurality of hoppers.

While the invention has been described in connection with a preferred embodiment, it will be understood that I do not intend to limit the invention thereto, but intend to cover all modifications and alternative constructions falling within the spirit and scope of the appended claims.

Turning now to the drawings, Figure 1 shows the present invention in simplified schematic form. I employ an impedance ratio unit or detector 20 having inductance coils 21, 22 and a movable armature 23. The armature is coupled to a weight-responsive device, so arranged that an increase in weight causes the armature to move linearly away from the coil 21 and toward the coil 22, thereby decreasing the inductance of one and increasing the inductance of the other. Connected in series with the detector 20 is a balancing unit 25 having inductances 26, 27 and a movable armature 28, corresponding coils being connected in series to form two parallel circuit legs. The device 25 is preferably identical to the device 20, except that the armature 28 is manually positioned by a micrometer rather than being connected to a weight-responsive member. Moving the armature 28 in a vertical direction causes the inductance of one of the coils to be decreased and that of the remaining coil to be correspondingly increased. The net output of the devices 20, 25 appears at terminals 29, 30. Associated with the terminals 29, 30 are rectifiers 31—34. As shown, such rectifiers are connected in ring formation, having output terminals 35, 36. Connected across the output terminals is a galvanometer 37, the circuit being completed by load resistors 38, 39. The circuit is supplied with alternating current from a source 40.

Prior to discussing the operation of the circuit described above, more detailed reference will be made to the physical construction of the impedance ratio unit 20 and the balancing unit 25. As shown in Fig. 2, the device 20 includes a hollow frame 45 which is preferably rectangular having an upper plate 46 and a lower plate 47. Such plates may be formed of metal having a linear load-strain characteristic. In some units, I have employed aluminum having a modulus of approximately 9,000,000 pounds/inch$^2$. In a typical application each of the plates 46 may have a thickness of 3/8 inch, a length of 20 inches, and a width of 2 inches. The center of the top plate is securely mounted to a support 48, and the center of the bottom plate has a hanger 49 for suspending the load. In carrying out the present invention, the two inductances 21, 22 are mounted on one of the plates vertically offset from one another and the armature 23 is rigidly connected to the opposing plate. As a result of the strain produced by the load, the inductances are moved relative to the armature, causing the armature to be moved away from the magnetic circuit of one of the inductances and more nearly into the magnetic circuit of the other.

More specifically, each of the inductances includes a core of "E" laminations having pole faces, designated by subscript "a," lying in a common plane. The inductances in each pair are arranged so that their pole faces are parallel to, but symmetrically offset from, one another. The armature is mounted for movement parallel to the pole faces and preferably consists of a stack of "I" laminations. Care should be taken that the core of each of the inductances is securely mounted relative to the lower plate upon supports or pedestals 51, 52, respectively, the armature being rigidly mounted on a vertical support 53. The armature should be guided in its movement to insure that an air gap of equal length is maintained on each side of the armature at all times. Additional guiding means may be provided if necessary to insure that this condition is fulfilled. It is found that the above offset arrangement of inductances with constant length of air gap is particularly advantageous, since a change of inductance takes place linearly with a change in the load, as will be more fully discussed. The arrangement shown in Figs. 2–4 is particularly well suited for measuring heavy loads ranging from zero to several thousands of pounds, and it will be understood that a cross section of the plates may be appropriately reduced or increased to accommodate lighter or heavier loads.

In accordance with the present invention, a balancing device including a similar set of inductances is employed at the control station, with a calibrated micrometer for varying the position of the armature relative to the inductances. An arrangement for accomplishing this is set forth in Fig. 5, reference being made also to the detailed views 6–8, inclusive. Here it will be noted that a control wheel 60 is provided for positioning the armature 28 relative to the two inductances 26, 27, and for simultaneously indicating such adjustment on a dial chart 61, which is directly calibrated in terms of load or weight. As shown in the drawings, the control wheel 60 is geared to a compound gear 62 which drives a threaded micrometer spindle 63, such spindle being coupled to a slidable table 64 by a threaded micrometer nut 65 secured to the under side of the table. Also secured to the under side of the table are way blocks 66, 67, which engage longitudinal way bars 68, 69. For the purpose of converting the movement of the table 64 to movement of the armature 28, an inclined plane 75 is provided which is hinged to the table at a pivot 76, being supported at the other end by an adjustable support 77. Riding on the inclined plane 75 is a roller 80, which is guided for vertical movement by a pair of vertical guide bars 81, 82. The guide bars are slidably received in tubular guides 83, 84 and 85, 86, respectively. The armature 28 is supported on the guide bars 81, 82, and it will be apparent that the armature movement which is produced corresponds to the movement of the table 64 and the control wheel 60. For the purpose of accurately indicating the position of the armature 28, a pointer 90 is provided having a drum 91 about which is wrapped a wire 92 which is in turn tautly mounted on the table by means of posts 93, 94.

The balancing device and its calibrated micrometer adjustment have been shown (Figs. 5–7) in simplified form. It will be understood that various refinements may be incorporated without departing from the invention especially for the purpose of removing any play between the pointer 90 and armature 28.

In setting up the circuit shown in Figure 1, the resistors 38, 39 are a matched pair having the same resistance and having the same thermal coefficient so that they remain matched over their entire range of operating temperature. Since such resistors in effect form a shunt across the galvanometer 37 they should have a resistance which is several times that of the galvanometer, and which in a practical case may be on the order of 1,000 ohms. In use, the galvanometer serves as a "null" indicator, indicating circuit balance, for example, indicating that a given change in the impedance ratio unit 20 has been counterbalanced by an equal and opposite change in the balancing unit 25. Using the matched resistors, the procedure for effecting tare correction, or initial balance, in the field is extremely simple. First of all, it will be assumed that the pointer 90 has a friction-tight connection with the drum 91. Using an empty hopper the handwheel 60 is turned until the meter 37 reads zero. The resulting position of the armature is its zero position, and, if desired, the pointer may be rotated slightly relative to the drum to insure that the pointer coincides with some arbitrary zero mark on the scale 61. If there is no arbitrary zero mark, it may still be desirable to position the pointer vertically.

In order to calibrate the dial chart 61, a convenient and known amount of weight is applied to the detector 20. The hand wheel 60 at the control station is then rotated so that readjustment of the armature 28 occurs, accompanied by progressive advancement of the pointer 90. When a null condition is reached as indicated by the galvanometer 37, an indicating mark or graduation, designating the applied weight, is placed on the dial chart 61. This operation is repeated for progressive increments of weight until the dial chart has a complete set of graduations. Once the dial chart is thus calibrated, it will be apparent that any unknown weight may be easily and quickly ascertained. Applying the unknown weight to the detector 20 causes a deflection in the galvanometer. Such deflection is reduced to zero by rotating the control wheel 60, and when the null condition is reached, the weight is simply read off of the dial chart 61 directly. In practice, and where the disclosed construction of the impedance coils and armatures is closely adhered to, substantial linearity may be achieved, and it is unnecessary separately to calibrate each weighing device. A duplicate dial chart may be prepared, corresponding to a chart previously calibrated for a prototype model, and any minor variations in the rate of increase may be compensated for by adjustment of the adjustable support 77 on the inclined plane.

It is one of the features of the present arrangement that direct indication with high sensitivity may be achieved without recourse to electronic amplifiers or the like, and without recourse to the use of critical resonant circuits. The operation of the present circuit may be understood upon reference to Figure 1. Any unbalance between the inductances in the two devices 20, 25 is evidenced by an unbalance of the voltages appearing at terminals 29, 30. It may be assumed, for example, that the R.M.S. voltage at terminal 29 is greater than the voltage at terminal 30. To determine the effect of this on the meter, it will be apparent that on positive half cycles, current will flow through rectifier 31, creating a given voltage drop across resistor 38. Simultaneously, current will flow from the terminal 30 in the opposite leg of the circuit through rectifier 32, creating a lesser voltage drop across the resistor 39. The difference in voltage drop will cause a given deflection of the galvanometer 37. On negative half cycles the rectifiers 31, 32 are inactive, and flow takes place through the opposite pair of rectifiers 33, 34, thereby effectively switching the load resistors 38, 39, as well as the meter terminals, from one leg of the inductance circuit to the other. This latter switching, combined with the midcycle switch in polarity in the A.-C. voltage wave, causes the meter to read in the same direction on both half cycles of the exciting current, the direction being indicative of the relative R.M.S. voltages at the terminals of the inductance circuit. In short, the average direct current flowing through the meter indicates, by its magnitude and its polarity, both the magnitude and the direction of the unbalance.

In accordance with one of the aspects of the present invention, the voltage across the galvanometer is employed for automatic operation of cutoff devices supplying bulk material to a weigh hopper or the like. Such arrangement is shown in Fig. 9, the circuit with minor additions being the same as in Fig. 1, having a conventional type of weight hopper indicated at 100, suspended from the weight-responsive device 20. Such weigh hopper is fed from a storage hopper 101 having a chute 102. Mounted in the chute is a progressive cutoff device 103 operated by coils or solenoids 104, 105, respectively. The cutoff device 103 and its control circuit have been indicated schematically since devices of this general type are well known to those skilled in the art. Briefly stated, the device 103 includes a pivoted gate, as shown; and is so arranged that energizing the solenoid 104 creates sufficient pull to cause the flow to be reduced, while energizing both of the solenoids produces a total pull which is sufficient to move the device 103 into the position shown, resulting in complete and final cutoff.

For the purpose of controlling the cutoff devices, relays 108, 109 are provided, which may be connected in parallel arrangement across the galvanometer 37 for controlling normally closed contacts 110, 111, respectively. Each of the relays 108, 109, has a threaded manual adjustment for controlling the voltage at which drop-out occurs, the adjustments being indicated at 112, 113, respectively. Relay 108 is adjusted for drop-out at a point 114 ahead of the null condition, as shown in Fig. 10, while the relay 109 is adjusted for drop-out at a point substantially at the null condition. The slope of current versus weight curve, in other words the sensitivity, of the arrangement is sufficiently great using sensitive commercially available relays so that the final cutoff point may be positioned extremely close to the null condition. While the circuit has been described in its simplest form, it will be apparent that electric contactors, hydraulic amplifiers or the like may be interposed between the relays 108, 109 and the material cutoff device 103 to reduce the loading on the control circuit without departing from the invention.

Using the arrangement shown in Fig. 9, a typical cycle of operation is as follows: It is assumed at the outset that the weigh hopper 100 is empty, that the pointer on the dial chart is set at zero, and that the galvanometer indicates the null condition. Under such conditions the contacts 110, 111 are closed, thereby cutting off the flow control device 103. Assuming that a weight of, say, 500 pounds is required, the operator rotates the control wheel 60 until 500 is indicated on the dial chart 61. This produces an unbalance between the inductances, causing flow of current in the galvanometer circuit and causing the relays 108, 109 to be picked up, thereby producing flow of material through the chute 102. An increase in the material in the weigh hopper causes progressive displacement of the armature 23 in the device 20, and, as the null condition is approached, the voltage applied to the relays becomes less and less. Finally, the point 114 is reached (Fig. 10), producing drop-out of the relay 108 and energization of the coil 104, substantially slowing down the flow. A small amount of additional material continues to flow through the chute until a null condition is reached, whereupon relay 109 drops out to energize the coil 105 resulting in final shutoff. The weigh hopper with its load of material may then be discharged by conventional means, and the cycle may be repeated either for the same or for a different selected weight.

It will be apparent that a plurality of such control systems may be used at a single control station for weighing appropriate amounts of ingredients required, for example, in the batching of concrete.

One of the advantageous features of the present device, including the series-parallel arrangement of inductances, is that the accuracy is not substantially affected by the length of the lines running between the detector and the control station. It has been found that runs of several hundred yards or more are perfectly practical, the same type of wire being used in each of the two legs. As a related advantage, the system is particularly immune to the effects of ambient temperature, as contrasted with conventional systems which require thermal compensation. The system is, for example, independent of the differences in ambient temperature which may exist between the control station and the detector. Where the control stations is artificially cooled, such differences may range up to 50° F. Furthermore, the system is proof against variations in ambient temperature which may occur from time to time at either of the two locations. Since the two legs of the circuit are symmetrical, any changes in temperature have an equal effect on both legs and, assuming that both inductances in a given unit are of the same temperature, which they normally will be because of their close proximity, there can be no net difference in voltage as a result of differences in, or changes of, temperature. Generally speaking, the present arrangement has been found to posses an unusually high degree of stability, and it is found that the calibration of the micrometer is maintained with high accuracy over long periods of time.

A further inherent advantage of the present system is that both the unbalance and corrective rebalancing adjustment or action occur in the same leg of the circuit. This is to be contrasted with conventional bridge circuits in which bridge unbalance is corrected by readjustment of the constants in a different leg of the circuit. The ratios between the inductances and the ratios between the resistances in the two pairs of legs therefore remain constant for all possible null conditions, which insures that the sensitivity will remain constant for all possible values of load and that the null condition will always be sharp and positively defined.

While the invention has been described in connection with a weight-measuring device and system, it will be apparent to one skilled in the art that it is not limited thereto, but would include use in other systems having a remotely located detector member wich is displaced in accordance with a load or other variable condition.

*Addition of scale weights*

In the above discussion it has been assumed that a single weigh hopper 100 is connected to a single detector 20, as shown, for example, in Fig. 9. As a practical matter, the weigh hopper 100 is generally supported at spaced points about its periphery by a number of load-gathering levers, such levers being connected to a single point of load application where the separate weights transmitted by the individual levers are added together. It is one of the features of the present invention that load-gathering levers may be omitted and that the weigh hopper may be supported at spaced points by a plurality of detector units electrically connected in series with one another. A circuit for accomplishing this and employing three detector units indicated at 20a, 20b and 20c is shown in Fig. 11. Each of the detectors is equivalent to that shown at 20 in Fig. 1. The first and second windings of all of the units are respectively in series, the net output being fed into a balancing unit 25, as shown. The latter unit has an armature 28 which is controlled by a micrometer, just as in the embodiment of the invention discussed above. In practice, it is found that the load need not be equally divided between the detector units 20a—20c, although one skilled in the art will appreciate that the load should be applied as symmetrically as possible in order to achieve the maximum accuracy of which the system is capable. A factor which contributes largely to the accuracy is the linear variation in inductance with weight which occurs upon employing the inductance core arrangement set forth, for example, in Figs. 2–4.

The procedure for establishing the zero point and for calibrating the dial 61 is the same as that previously described.

Elimination of the load-gathering levers not only enables a substantial reduction in cost, but avoids the difficulties with friction and maintenance which are inherent in the use of force-transmitting levers when exposed to dirt and the atmosphere.

While the units 20a—20c are ideally suited for supporting a single weigh hopper at a plurality of points, it will be apparent that such units may be employed, if desired, for supporting three separate weigh hoppers in the same manner as shown in Fig. 9. In the latter event the weight reading which is obtained in the balancing unit is the sum of the materials in the respective hoppers. Such information may be valuable where, for example, the operator must know the total weight of the various sizes of gravel which may be employed in a given batch of concrete. Where it is desired automatically to subtract the weight in a specified hopper from the weight in, say, two other hoppers, it is sufficient simply to interchange the connections going to the first coil of the corresponding detector unit with those going to the second coil of such unit, so that the variation of impedance in the unit takes place in the opposite or subtractive sense relative to the variation taking place in the other two units.

I claim as my invention:

1. In a device for remote indication of position, the combination comprising a displaceable member, a detector unit having first and second inductances, means for changing the ratio between the inductances in accordance with the positioning of said member, a balancing unit having first and second inductances and having means for changing the ratio between the inductances, said first inductances and said second inductances being connected respectively in series to form two parallel legs of a four leg impedance-comparison circuit, a pair of substantially identical resistance members connected in parallel to form the other two parallel legs of said circuit, each of said sets of parallel legs being connectable in series across a source of alternating current, and means for indicating when the legs of said circuit are in balance.

2. In a device for remote indication of position, the combination comprising a displaceable member, a detector unit having first and second inductances and having means including an armature connected to said displaceable member for changing the ratio between the inductances in accordance with the displacement, a balancing unit having first and second inductances and having means for changing the ratio between the inductances, said first inductances and said second inductances being connected respectively in series to form two parallel legs of a four leg impedance-comparison circuit, a pair of substantially identical resistance members connected in parallel with each other and in series with said first two legs to form the other two parallel legs of said circuit, a source of alternating voltage connected to said legs, and means for indicating the difference in the voltage drops in the respective legs.

3. In a device for remote indication of position, the combination comprising a displaceable member, a detector unit having first and second inductances and having an armature connected to said displaceable member for changing the ratio between the inductances, a balancing unit having first and second inductances and having a displaceable armature for changing the ratio between the inductances, said balancing unit further having means including a calibrated micrometer for adjusting the position of the armature, said first inductances and said second inductances being connected respectively in series to form two parallel legs of a four leg impedance-comparison circuit, a pair of substantially identical impedance members connected in parallel with each other and in series with said first two legs to form the other two parallel legs of said circuit, and means including a source of alternating voltage for indicating when the impedance in said legs is the same.

4. In a device for remote indication of position, the combination comprising a displaceable member, a detector unit having first and second inductances and having an armature connected to said displaceable member for changing the ratio between the inductances, a balancing unit having first and second inductances and having a displaceable armature for changing the ratio between the inductances and having means including a calibrated micrometer for adjusting the position of the armature, said first inductances and said second inductances being connected respectively in series to form two parallel legs of a four leg impedance-comparison circuit, means including matched load impedances connected in series with said legs to form the other two legs of said circuit, a source of alternating voltage connected to said load impedances and to the inductances in said detector and balancing units, and means for indicating the difference in voltage drop across the inductances in said parallel legs.

5. In a device for remotely indicating the position of a displaceable member, the combination comprising a detector unit having first and second inductances and having an armature connected to said displaceable member for changing the ratio between the inductances in accordance with the displacement, a balancing unit having first and second inductances and having a displaceable armature for changing the ratio between the inductances, said balancing unit further having means including a calibrated micrometer for adjusting the position of the armature therein, said first inductances and said second inductances being connected respectively in series to form two parallel legs of a four leg impedance-comparison circuit, a pair of substantially identical impedance members connected in parallel with each other and in series with said first two legs to form the other two parallel legs of said circuit, and means including a source of alternating voltage for indicating the direction and magnitude of the difference in the voltage drops in the respective legs.

6. In a device for remote indication of load, comprising in combination, means including a displaceable member which is displaced in accordance with the load, a detector unit having first and second inductances and having an armature connected to said displaceable member for changing the ratio between the inductances, a balancing unit having first and second inductances and having a displaceable armature for changing the ratio between the inductances, said balancing unit having means including a micrometer for manually adjusting the position of the armature therein, said first inductances and said second inductances being connected respectively in series to form two parallel legs of an impedance-comparison circuit, and means including a source of alternating voltage for indicating when the total inductance in the two legs is balanced, said micrometer being directly calibrated in terms of load so that manual adjustment for the balanced condition provides a direct indication of magnitude of the applied load.

7. In a device for remote indication of weight, the combination comprising a plurality of weight-responsive members, a plurality of detector units connected thereto, each of said detector units having first and second inductances, together with means for varying the inductance ratio in accordance with the weights applied to the associated weight-responsive members respectively, a balancing unit having first and second inductances, means for connecting said first inductances and said second inductances respectively in series to form two symmetrical legs of a four leg impedance-comparison circuit, a source of alternating voltage connected to said legs, and means for indicating when the total inductance in said two legs is balanced.

8. In a device for remote indication of weight, the combination comprising a plurality of weight-responsive members, a plurality of detector units connected thereto, each of said detector units having first and second inductances together with means for varying the inductance ratio in accordance with the weights applied to the associated weight-responsive members respectively, a balancing unit having first and second inductances together with means for adjusting the inductance ratio, means for connecting all of said first inductances and all of said second inductances respectively in series to form two symmetrical legs of an impedance-comparison circuit, a source of alternating voltage connected to said legs, means for indicating when the total inductance in said two legs is balanced, the adjusting means in said balancing unit being calibrated directly in terms of the total weight applied to the weight responsive members.

9. In a four leg impedance-comparison circuit, in combination, first and second inductance members having means for changing the ratio of the inductances of said members to effect circuit unbalance; third and fourth inductance members having means for changing the ratio of the inductances of each of said pair of members to effect rebalancing of said circuit, said first and third inductance members being connected in series to form a first leg of said circuit, said second and fourth inductance members being connected in series to form a second leg of said circuit; a pair of substantially identical impedance members connected to provide the third and fourth legs of said circuit; an alternating current source, said first and third legs being connected in series and said second and fourth legs being connected in series across said source; and means connected between the junction of said first and third arms and said second and fourth arms for indicating circuit balance.

10. In combination, a detector unit having first and second inductances and a movable member for changing the ratio of the inductances in proportion to the degree of movement of said member; a balancing unit adapted to be positioned remotely from said detector unit, said balancing unit having first and second inductances and a movable member for changing the ratio of the inductances in proportion to the degree of movement of said member, said first inductances and said second inductances being connected respectively in series to form two parallel legs of an impedance comparison circuit; means including a source of alternating current for indicating when the total inductance in said two legs is balanced; and means for effecting movement of said balancing unit movable member to effect circuit rebalancing after said circuit has been unbalanced by movement of said detector unit movable member.

11. The combination according to claim 10 wherein said last-mentioned means includes means for indicating the magnitude of movement of said detector unit movable member.

References Cited in the file of this patent

UNITED STATES PATENTS

| | | |
|---|---|---|
| 1,496,786 | Schackelton | June 10, 1924 |
| 1,901,741 | Fetsch | Mar. 14, 1933 |
| 1,923,745 | Platzer | Aug. 22, 1933 |
| 2,012,479 | Planta | Aug. 27, 1935 |
| 2,328,320 | Baruch et al. | Aug. 31, 1943 |
| 2,400,571 | Olesen | May 21, 1946 |
| 2,421,420 | Hathaway | June 3, 1947 |
| 2,498,103 | Wojciechowski | Feb. 21, 1950 |
| 2,503,513 | Schellman | Apr. 11, 1950 |
| 2,516,456 | Fischer | July 25, 1950 |
| 2,544,155 | Harkenrider | Mar. 6, 1951 |
| 2,620,469 | Estes | Dec. 2, 1952 |
| 2,786,669 | Safford et al. | Mar. 26, 1957 |

FOREIGN PATENTS

| | | |
|---|---|---|
| 400,289 | Great Britain | Oct. 26, 1933 |
| 834,106 | France | Aug. 8, 1938 |